US007315828B1

(12) United States Patent
McCarthy et al.

(10) Patent No.: US 7,315,828 B1
(45) Date of Patent: Jan. 1, 2008

(54) METHOD OF AND SYSTEM FOR DELIVERING COMBINED SOCIAL EXPRESSION CARDS AND GIFT CERTIFICATES

(75) Inventors: Mary K. McCarthy, Columbus, GA (US); Vickie Portwood Kruger, Columbus, GA (US); David A. Reynolds, Columbus, GA (US); Shere Lynne Anderson, Columbus, GA (US)

(73) Assignee: Hallmark Cards, Incorporated, Kansas City, MO (US)

( * ) Notice: Subject to any disclaimer, the term of this patent is extended or adjusted under 35 U.S.C. 154(b) by 553 days.

(21) Appl. No.: 09/378,678

(22) Filed: Aug. 20, 1999

(51) Int. Cl.
G06Q 30/00 (2006.01)
(52) U.S. Cl. .......................... 705/26; 705/27
(58) Field of Classification Search .................. 705/26, 705/27
See application file for complete search history.

(56) References Cited

U.S. PATENT DOCUMENTS

| | | | |
|---|---|---|---|
| 4,359,631 A | 11/1982 | Lockwood et al. | 235/381 |
| 4,616,327 A | 10/1986 | Rosewarne et al. | 364/518 |
| 4,699,532 A | 10/1987 | Smith | 400/104 |
| 4,809,837 A | 3/1989 | Hayashi | 194/205 |
| 5,029,099 A | 7/1991 | Goodman | 364/479 |
| 5,036,472 A | 7/1991 | Buckley et al. | 364/479 |
| 5,038,293 A | 8/1991 | Goodman | 364/479 |
| 5,056,029 A | 10/1991 | Cannon | 364/468 |
| 5,119,293 A | 6/1992 | Hammond | 364/401 |
| 5,132,915 A | 7/1992 | Goodman | 364/479 |
| 5,235,519 A | 8/1993 | Miura | 364/479 |
| 5,243,174 A | 9/1993 | Veeneman et al. | 235/381 |
| 5,251,251 A | 10/1993 | Barber et al. | 379/67 |
| 5,408,417 A | 4/1995 | Wilder | 364/479 |
| 5,442,567 A | 8/1995 | Small | 364/479 |
| 5,477,037 A | 12/1995 | Berger | 235/379 |
| 5,500,514 A | 3/1996 | Veeneman et al. | 235/381 |
| 5,513,117 A * | 4/1996 | Small | 700/233 |
| 5,546,316 A | 8/1996 | Buckley et al. | 364/479.03 |
| 5,552,994 A | 9/1996 | Cannon et al. | 364/468.01 |
| 5,555,496 A | 9/1996 | Tackbary et al. | 364/401 R |
| 5,559,714 A | 9/1996 | Banks et al. | 364/479.03 |
| 5,561,604 A | 10/1996 | Buckley et al. | 364/479.05 |

(Continued)

OTHER PUBLICATIONS

"GiftPro.com Makes Sending A Gift Certificate From Many Major Retailers And Restaurants Easy," Business Wire, May 25, 1998, Dialog file 20, 01711048.*

(Continued)

Primary Examiner—Robert M. Pond
(74) Attorney, Agent, or Firm—Jonathan E. Jobe; Dillon & Yudell LLP

(57) ABSTRACT

A method of and system for producing combined social expression cards and gift certificates for delivery to recipients is implemented in a Web-based client-server environment in which remotely located customers use standard Web browsers to access a Web server. The Web server presents a remotely located customer with a selection of social expression card designs and selection of gift certificates. In response to customer selection of a card design and a gift certificate, the system of the present invention delivers a combined social expression card and gift certificate to a recipient designated by the customer. Delivery according to the present invention may be accomplished either by printing and mailing a physical product to the recipient or by delivering an electronic version to the recipient by electronic mail.

26 Claims, 18 Drawing Sheets

U.S. PATENT DOCUMENTS

| | | | | |
|---|---|---|---|---|
| 5,600,563 | A | 2/1997 | Cannon et al. | 364/468.24 |
| 5,615,123 | A | 3/1997 | Davidson et al. | 364/479.03 |
| 5,687,087 | A | 11/1997 | Taggart | 364/479.03 |
| 5,710,886 | A * | 1/1998 | Christensen et al. | 705/14 |
| H1708 | H | 2/1998 | Davidson et al. | 364/479.01 |
| 5,748,484 | A | 5/1998 | Cannon et al. | 364/479.03 |
| 5,751,590 | A | 5/1998 | Cannon et al. | 364/479.03 |
| 5,870,718 | A * | 2/1999 | Spector | 705/26 |
| 6,321,211 | B1 * | 11/2001 | Dodd | 705/26 |

OTHER PUBLICATIONS

Pr Newswire, "Borders.com Online Gift Center Rescues Last-Minute Holiday Shoppers," Dec. 4, 1998, Dialog file 20 # 03654067.*

Internet Archive Wayback Machine, http:/web.archive.org/web/*//http://www.borders.com, 2 pages.*

Internet Archive Wayback Machine, http:/web.archive.org/web/19980111035340/http://borders.com.*

Internet Archive Wayback Machine, http:/web.archive.org/web/19980111035542/borders.com/stores.index.html, 2 pages.*

Internet Archive Wayback Machine, http:/web.archive.org/web/19980111040641/borders.com/stores/states/va.html, 2 pages.*

PR Newswire, "Nordstrom Launches Online Store At WWW.Nordstrom.com," Oct. 21, 1998, Dialog file 20 #0317581.* http://www.giftcertificateexpress.com/corporate_gifts.htm, Apr. 12, 1999.

http://www.cardexpress.com, Apr. 12, 1999.

USA Gifts.com, Instant Online Gift Certificates Press Release 1999.

http://www.giftpro.com, Apr. 19, 1999.

http://www.naftatrade.com/media/art9803gc.html, Apr. 12, 1999.

* cited by examiner

②Choose Merchant Gift Card

Shopping Basket   Order Status   Help   About Us   Home   Product Information

Merchant selected         Home Depot
                                        ╭─ 63
Number of cards desired    [    1    ]✓        *

Amount of Gift Card to be given
                                  ╭─ 65
○ $10.00    ○ $25.00    ○ $50.00    ○̸ $100.00    *
                                                        ╭─ 67
② Return to Merchant Selection         Go To Step ③

*Required Information

FIG. 11

③ Add Your Personal Message

Shopping Basket   Order Status   Help   About Us   Home   Product Information

View Sample

Your chosen Card

SOMETHING FOR THE BIRTHDAY BOY!

Select the check box for fields you would like to be copied to the remaining cards on your list.

Recomended Verses — 71

○ Happy Birthday

○ Best wishes on your Birthday

○ Have a great time on your Birthday

To (recipient's name to be printed on inside of card) — 73

From (sender's name to be printed on inside of card) — 75

Company Name (if applicable) — 77

Type Your Personal Message Here (to be printed on inside of card)

FIG. 13A

Company Name (if applicable)

Type Your Personal Message Here (to be printed on inside of card) ─ 79

(Limit 64 characters for message)

Recipient's Information (for mailing address printed on the front of the card)

First Name: ─ 80
Last Name:
Street:
City:  State:  Zip:
Country: USA
Email Address:
Phone:

─ 81
Return to Card List

Company Name (If applicable)

Type Your Personal Message Here (to be printed on inside of card)

(Limit 64 characters for message)

Recipient's Information (for mailing address printed on the front of the card)

First Name:
Last Name:
Street:
City:          State:    Zip:
Country:  USA
Email Address:
Phone:

83 — Add to Basket          85 — Clear Entry

FIG. 14B

METHOD OF AND SYSTEM FOR DELIVERING COMBINED SOCIAL EXPRESSION CARDS AND GIFT CERTIFICATES

FIELD OF THE INVENTION

The present invention relates generally to the field of electronic commerce, and more particularly to a Web-based method of and system for delivering combined social expression cards and gift certificates.

DESCRIPTION OF THE PRIOR ART

People like to commemorate important events in people's lives, such as weddings and birthdays, and show their appreciation and affection for others by sending gifts and social expression cards, such as greeting cards. Most greeting cards sent today are generic cards purchased in retail establishments such as card shops, gift shops, grocery stores and the like. Gifts, of course, may be purchased at any of a number of retail establishments.

It is not always easy to find a generic card that expresses the right sentiment. Additionally, there is a desire on the part of most people to personalize their gifts and greeting cards. Most people write a personal greeting in the generic cards that they send to others. Recently, there have been introduced card vending machines or kiosks that enable purchasers to create personalized printed social expression cards.

In the area of gifts, most people prefer to give a gift that they believe will be meaningful to and appreciated by the recipient. However, a giver may know only generally the wants and needs of a particular recipient. For example, giver may know that an intended recipient likes music or a particular style of clothing. However, the giver may not know which musical group the recipient likes or whether the recipient would prefer one article of clothing over another. In such instances, the gift certificate from a store that carries goods of the type appreciated by the recipient might be an appropriate gift.

The traditional method of purchasing requires that a person visit one or more retail establishments. Most people like to send a card with a gift. Accordingly, purchasing a gift may require travel to one or more card shops as well as one or more gift or other retail stores in order to find the right combination of a card and gift. In today's busy world, many people find it difficult to find the time to shop for cards and gifts.

The Internet is currently exploding in terms of numbers of users and the variety of information and other resource available. The Internet has brought electronic commerce into peoples homes and offices. People are now able to use the Internet to shop for and purchase a wide variety of goods and services ranging from sporting event and airline tickets to flowers and wine. It is an object of the present invention to use the power of the Internet to enable people to select, purchase, and send social expression cards and gifts by visiting a Website.

SUMMARY OF THE INVENTION

The present invention provides a method of and system for producing combined social expression cards and gift certificates for delivery to recipients. According to the present invention, the term gift certificate includes all items or indicia that may be exchanged for goods or services, including, but not limited to in store certificates, coupons, stored value cards, and the like. The present invention is preferably implemented in a Web-based client-server environment in which remotely located customers use standard Web browsers to access a Web server. The Web server presents a remotely located customer with a selection of social expression card designs and a selection of gift certificates. In response to customer selection of a card design and a gift certificate, the system of the present invention delivers a combined social expression card and gift certificate to a recipient designated by the customer. Delivery according to the present invention may be accomplished either by printing and mailing a physical product to the recipient or by delivering an electronic version to the recipient.

The present invention enables a customer to select a gift certificate by displaying to the customer a list of merchants from which gift certificates are available. The merchants may be national, regional, or local. In order to enable a customer to select a merchant located near the recipient, the customer may access a list of locations for a selected merchant. Preferably, the system of the present invention displays a list of states in which the selected merchant has at least one location. In response to customer selection of state from the list of states, the system displays a list of locations for the selected merchant within the selected state.

After the customer has selected a social expression card style and a merchant for the gift certificate, the system of the present invention prompts the customer designate the number recipients to whom the selected combined card is to be sent and the amount of the gift. The customer may thus designate one or more recipients of a particular card. The customer may enter a gift amount or select an amount from a list of predefined amounts. The system of the present invention prompts the customer to personalize each card with the recipient's and sender's name and a sentiment, which may be selected from a list of predefined sentiments or entered by the customer.

After the customer has completed selection of a gift card or a set of gift cards, the customer may add the card or set of cards to a "shopping basket." When the customer is finished shopping, the customer may check out by authorizing the operator of the system to charge the contents of the shopping basket to a credit card or some established customer. Upon receipt of credit card verification, the system provides the customer with a confirmation number and proceeds to production and fulfillment of the order.

In the embodiment in which a physical card is mailed to the recipient, the data selected by the customer is converted into a file with fields that can be recognized by a digital printing press. The converted file is transmitted to a print server at a printing location. The print server may store files until a certain number of transactions have been processed, at which time the stored files may be released to a digital press for batch printing.

In the preferred embodiment of the present invention, the combined social expression card and gift certificate is produced by printing on both sides of a single sheet of material. The recipient's name and mailing address and the sender's name and return address are printed on one side of the sheet. The personalized sentiment is printed on the other side of the sheet. The gift certificate is printed on a separable portion of the sheet. Preferably the sheet of material is folded around the separable portion with side bearing the names and addresses exposed and sealed to form a self mailer, although alternative mailing arrangements are within the scope of the present invention. The gift cards may be individually stamped and mailed, or they may be boxed for bulk transport to the customer or other party for mailing.

Preferably, each card bears a unique identifier, such as a bar code, so that the card can be tracked through the production and fulfillment process. A first bar code reader may be positioned at the end of the press to detect that the card has actually been printed. A second bar code reader may be positioned in the mail handling line to verify that the card has been processed for mailing.

BRIEF DESCRIPTION OF THE DRAWINGS

FIG. 11 is a pictorial view of a gift selection Web page according to the present invention.

FIGS. 13A and 13B comprise a pictorial view of a card personalization Web page according to the present invention, for multiple gift card orders accessed from the Web page of FIG. 12.

FIGS. 14A and 14B comprise a pictorial view of a card personalization Web page according to the present invention, for single gift card orders accessed from the Web page of FIG. 11.

DESCRIPTION OF THE PREFERRED EMBODIMENT

Figure 1:
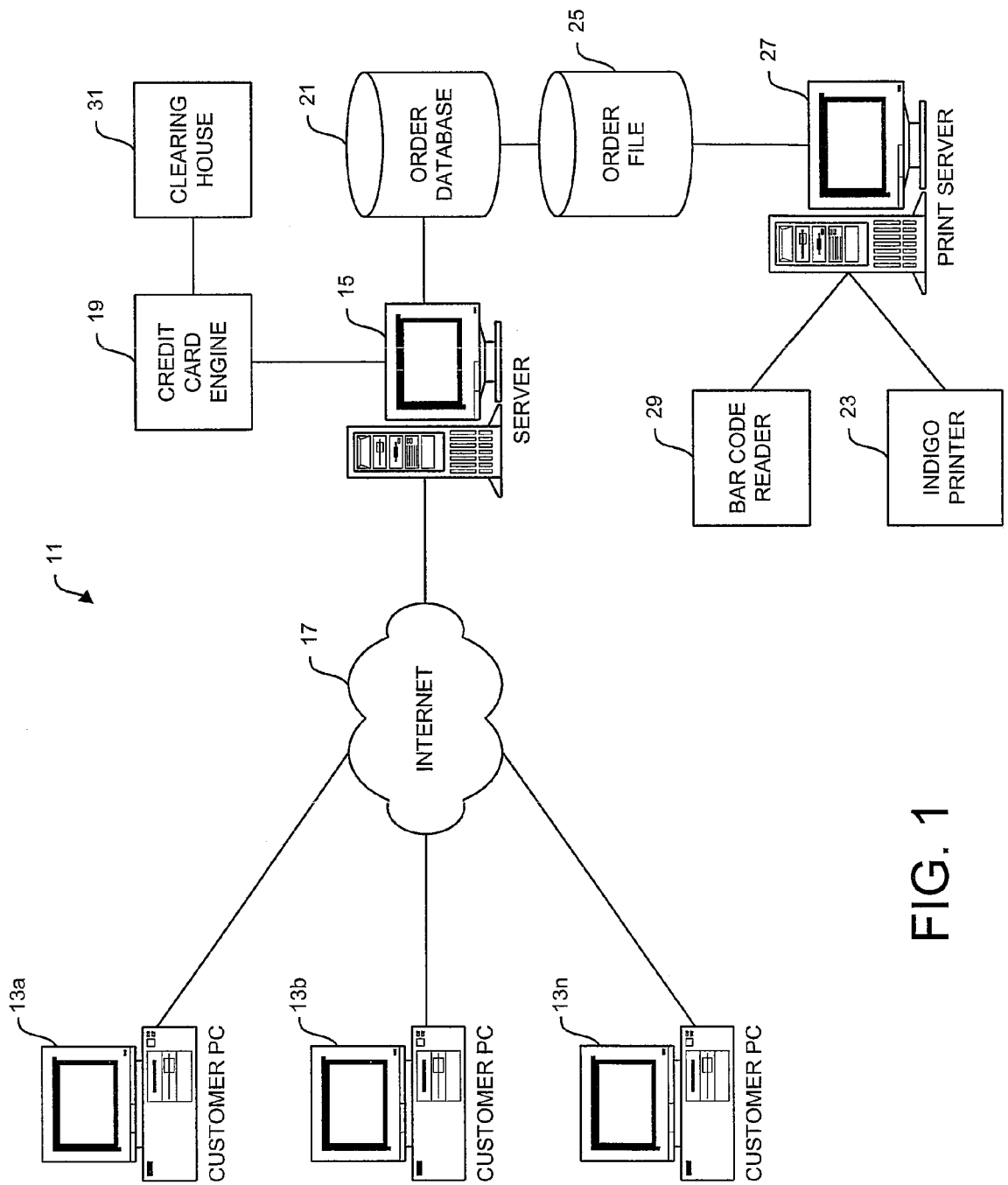
FIG. 1 is block diagram of a system according to the present invention.

Referring now to the drawings, and first to FIG. 1, a system according to the present invention is designated generally by the numeral 11. System 11 is implemented in a Web based environment that includes a plurality of customer personal computers (PCs) 13 and one or more Web servers 15 interconnected by the Internet indicated generally at 17. The PCs 13 have installed thereon a graphical operating environment, such as Microsoft Windows 98™, and a commercially available Web browser, such as Netscape Navigator™ or Microsoft Internet Explorer™.

The architecture and operation of Web based systems are generally well known to those skilled of the art. As will be explained in detail hereinafter, customers operate PCs 13 to work with Web pages transmitted from server 15 to create and order combined social expression cards and gift certificates according to present invention.

As used herein, the term gift certificate includes all items or indicia that may be exchanged for goods or services, including, but not limited to in store certificates, coupons, stored value cards, and the like. In store gift certificates may be exchanged for goods or services of the recipient's choosing, and, generally, any difference in the selling price of the goods and the face value of the certificate is collected from or refunded to the recipient in cash. Coupons generally entitle the recipient to purchase specified goods or services at a discount. Stored value cards are similar to in store gift certificates in that they have a face value that may be exchanged for goods or services; they differ from in store gift certificates in that if the selling price of the goods is less than the value of the stored value card, the difference is deducted from the value of the card rather than being refunded to the recipient in cash. Store value cards thus drive repeat business with the merchant.

At the completion of the customer order input process, server 15 obtains a credit card verification from a credit card engine indicated generally at 19. Completed and pending orders are maintained in an order database 21. The graphical or image and text files in order database 21 are extracted and converted to data fields that can be recognized by a digital printing press, such as an Indigo™ printer 23, and the stored in an order file 25. Periodically, a print server 27 transmits the order files to printer 23 for batch printing. Printer 23 is adapted to print variable data. Thus, each card is unique as it comes off printer 23, thereby allowing for full customization and personalization of the process for each customer. After printing, and as will be explained in detail hereinafter, the gift cards are scanned by one or more bar code readers in order to track of the progress and completion of individual orders. When a gift card is ready to be mailed, the system charges the customer's credit card and transmits the charge information to a clearinghouse, indicated generally at 31.

Figure 2:
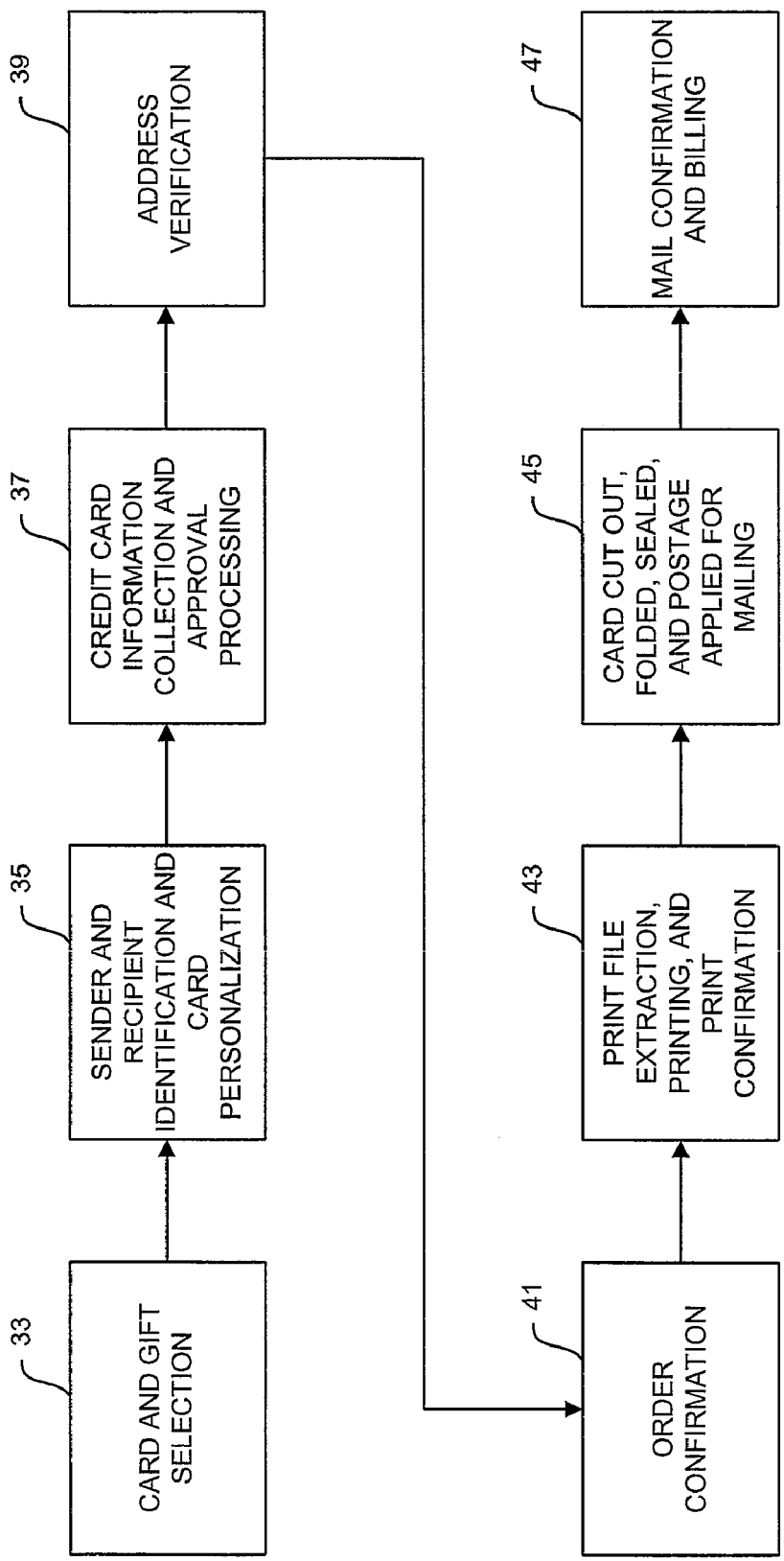
FIG. 2 is a high level work flow diagram of processing according to a postal delivery embodiment of the present invention.

Referring now to FIG. 2, there is shown a high-level workflow diagram of the method of the present invention. Generally, the method of the present invention comprises a selection and billing process and a production and fulfillment process. The selection billing process includes card and gift selection, indicated generally at block 33 and discussed in detail with respect to FIGS. 5-14 hereinafter. After the card and gift have been selected, the system of present invention performs sender and recipient identification and card personalization processing, at block 35. Then, the system of the present invention performs credit card information collection and approval processing, at block 37. In the preferred embodiment of the present invention, the system performs address verification, at block 39. Address verification includes checking in a database to verify that the recipient's address and zip code are valid. After credit card approval processing, at block 37, and address verification, at block 39, the system performs order confirmation processing, at block 41. During order confirmation, the customer is provided with a confirmation number and information on obtaining order status.

The production and fulfillment process includes print file extraction, printing, and print confirmation, as indicated at block 43. During print file extraction, the graphical or image and text data entered or selected by the customer at blocks 33 and 35 are converted into a file that can be recognized by a digital printing press. Periodically, the print files are transmitted to be digital printing press for printing. According to the present invention, each individual gift card is identified by a unique identifier, such as a bar code. A bar code reader is provided at the end of the digital printing press. The bar code reader confirms that the card has been printed.

After printing, at block 43, the card is cut out, folded, and sealed, and postage is applied for mailing, as indicated at block 45. In the preferred embodiment, cards are printed two at a time on a relatively large sheet of card stock. Cutting, folding, and sealing according to present invention will be illustrated and described with respect to FIGS. 15-19. Prior to actual mailing, the completion of the order is confirmed, again preferably by bar code scanning.

Figure 3:
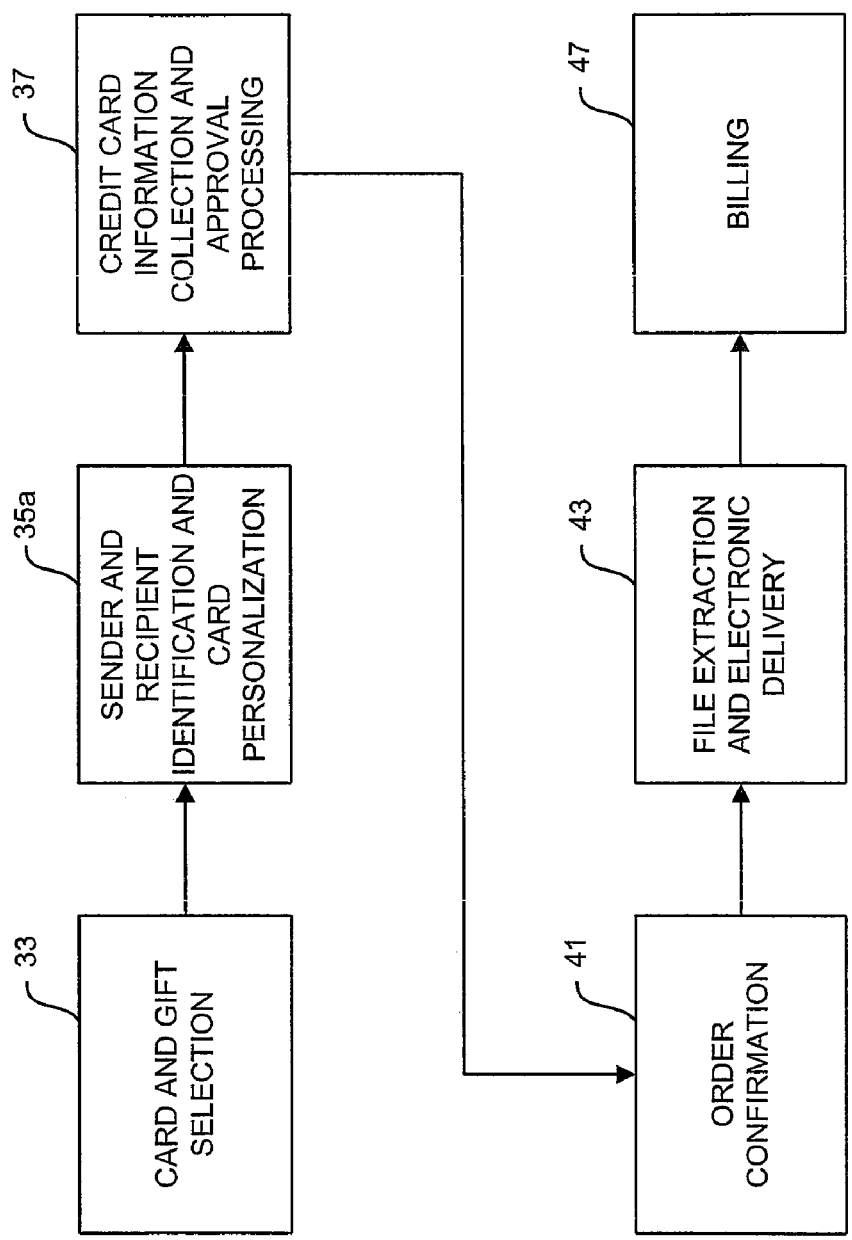
FIG. 3 is a high level work flow diagram of processing according to an electronic delivery embodiment of the present invention.

In an alternative embodiment of the invention, the combined social expression card and gift certificate is delivered electronically by electronic mail or the like. As in the case of the physical card embodiment of the present invention, the electronic embodiment of the present invention includes a selection and billing process and a file extraction or data linking and electronic delivery process. Referring to FIG. 3, the selection and billing process is virtually the same as that of the physical card embodiment. The selection and billing process includes card and gift selection, indicated at block 33 and sender and recipient identification and card personalization, indicated at block 35a. Sender and recipient identification of the electronic embodiment of the invention differs from that of the physical card embodiment in that the sender and recipient addresses are electronic mail addresses rather than postal addresses. After sender and recipient identification and card personalization, the system of the present invention performs credit card information collection and approval processing, at block 37. If the customer's credit card is approved, the system provides order confirmation, at block 41, and performs file extraction and electronic delivery at block 43a. The data selected or supplied by the customer is sent to a computer server preferably via the Internet. From this server, a credit card processing software will send the customer's credit card information to a credit card processing company preferably via a telephone line to verify the credit of the customer.

Once approved, the server will release a confirmation number to the customer to appear on the web page and simultaneously release the customer data to a system that sends the electronic gift card. A text file, with the specific fields of the customer's selections, including occasion and message, will activate the various designs and verses chosen by the customer and assemble them into a single output record which is then compiled and delivered to the recipient electronically. For example, the card may be delivered as an attachment to an electronic mail item or the recipient may be given a URL and password to access the card via the Internet. The merchant is responsible for providing a unique range of numbers that guide the redemption process and protect against duplication. Customers will have the option to call an 800 number for service inquires. The phone number will be shown on the Internet site, as well as on the merchant gift card the customer will redeem. Upon electronic delivery, the system bills the customer's credit card, at block 47. The recipient may redeem the gift by visiting the merchant's Web site, which may be linked to the electronic gift card of the present invention, and entering a unique PIN or other identifier.

Figure 4:
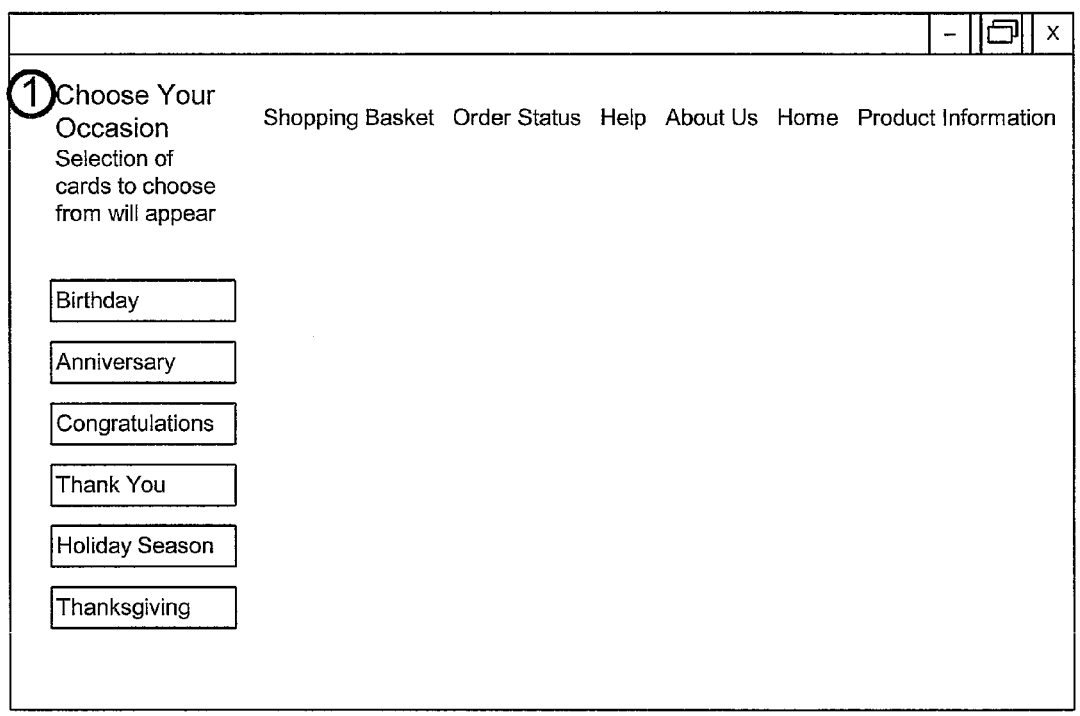
FIG. 4 is a pictorial view of an occasion choice Web page according to the present invention.
Figure 5:
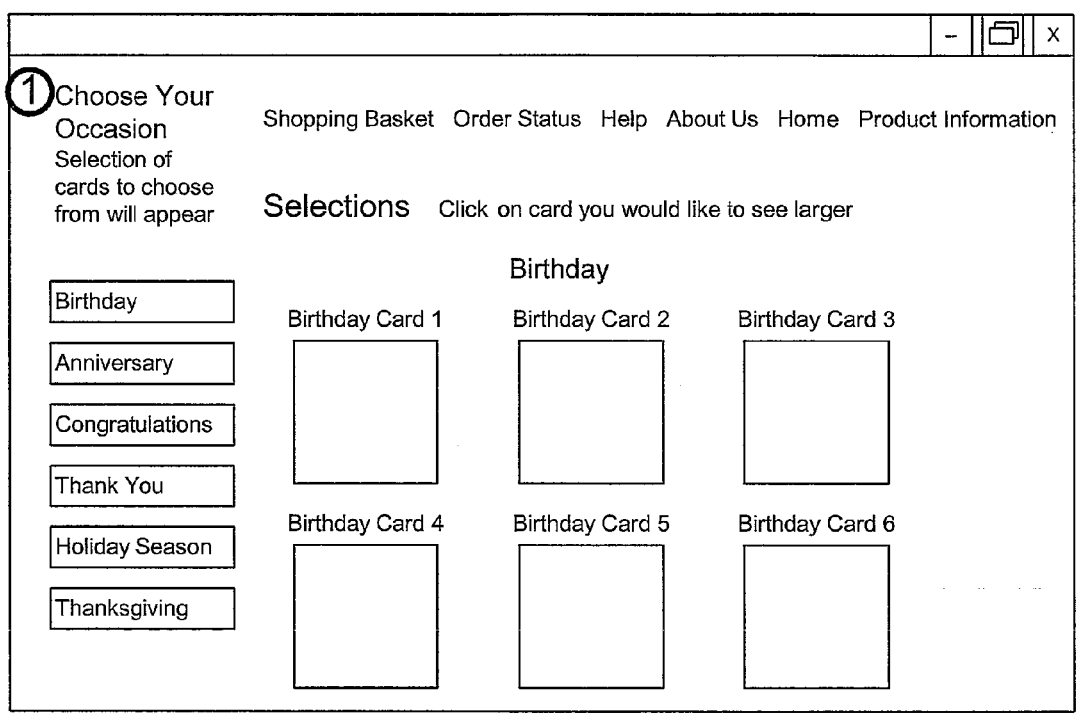
FIG. 5 is a pictorial view of a card selection Web page according to the present invention.

Referring to FIGS. 4-14, there are illustrated Web pages for card and gift selection, and sender and recipient identification and card personalization according to the present invention. Referring first to FIG. 4, a customer is prompted to choose an occasion for the card and gift. As shown in FIG. 4, the occasions include birthday, anniversary, congratulations, thank you, holiday season, and Thanksgiving. Upon selection of an occasion from the Web page of FIG. 4, the system presents a Web page of the type illustrated in FIG. 5. In FIG. 5, customer has selected the birthday occasion and the Web page of FIG. 5 presents images of the available birthday cards. As shown in FIG. 5, the customer is prompted to click on one of the displayed birthday card images.

Figure 6:
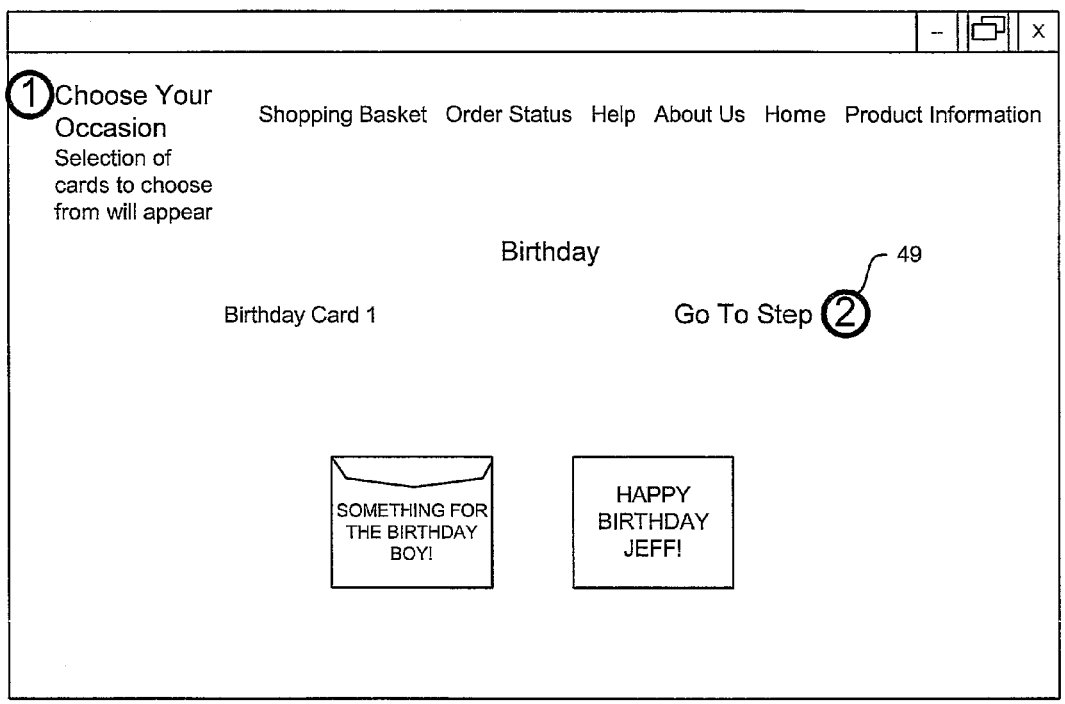
FIG. 6 is a pictorial view of a view selected card Web page according to the present invention.

Selection of a card image displayed in FIG. 5 causes the system to display the Web page of FIG. 6. The Web page of FIG. 6 displays enlarged images of the card selected in the Web page of FIG. 6. If the customer is satisfied with the card displayed in FIG. 6, the customer may proceed to merchants selection by selecting a "Go To Step 2" control 49. If the customer is not satisfied, the customer can return to the Web page of FIG. 5 by clicking on the browser's "back" control or by clicking on a "Return To Card Selection" control (not shown) displayed in the Web page of FIG. 6.

Figure 7:
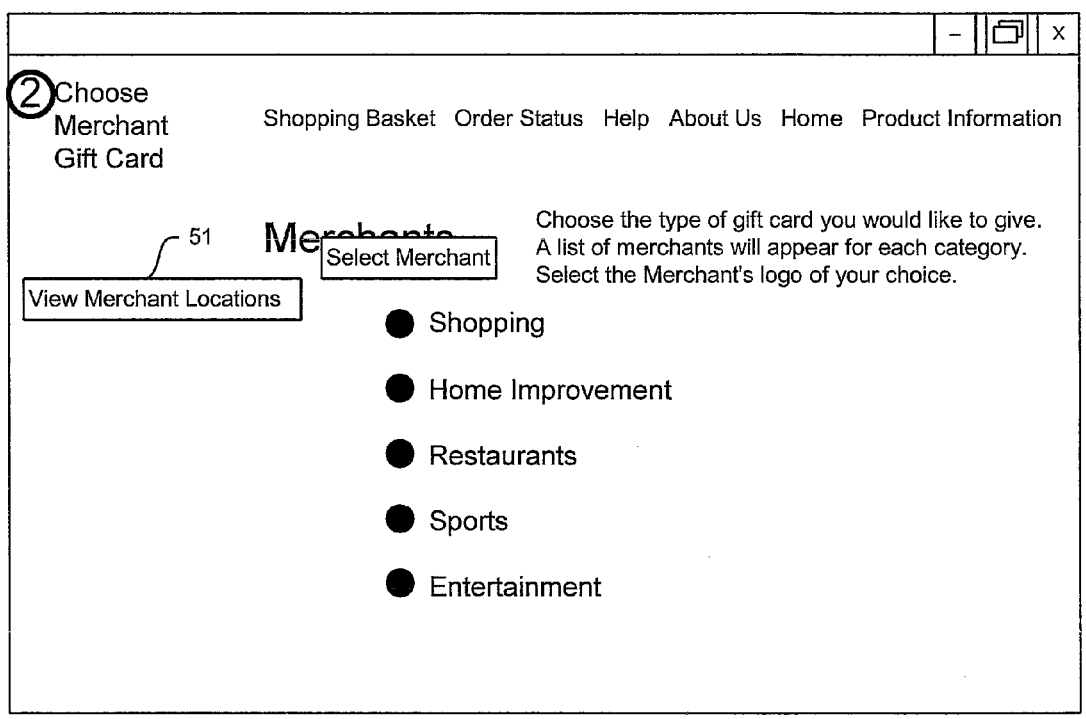
FIG. 7 is a pictorial view of a merchant selection Web page according to the present invention.

Referring now to FIG. 7, there is shown a merchant selection Web page according to the present invention. The merchant selection Web page includes a listing of merchant categories, including shopping, home improvement, restaurants, sports, and entertainment, as well as logo icons for particular merchants. The customer can select a merchant by clicking on the appropriate merchant control or icon. However, according to the present invention, the customer can obtain merchant location information by clicking on a "View Merchant Location" control 51.

Figure 8:
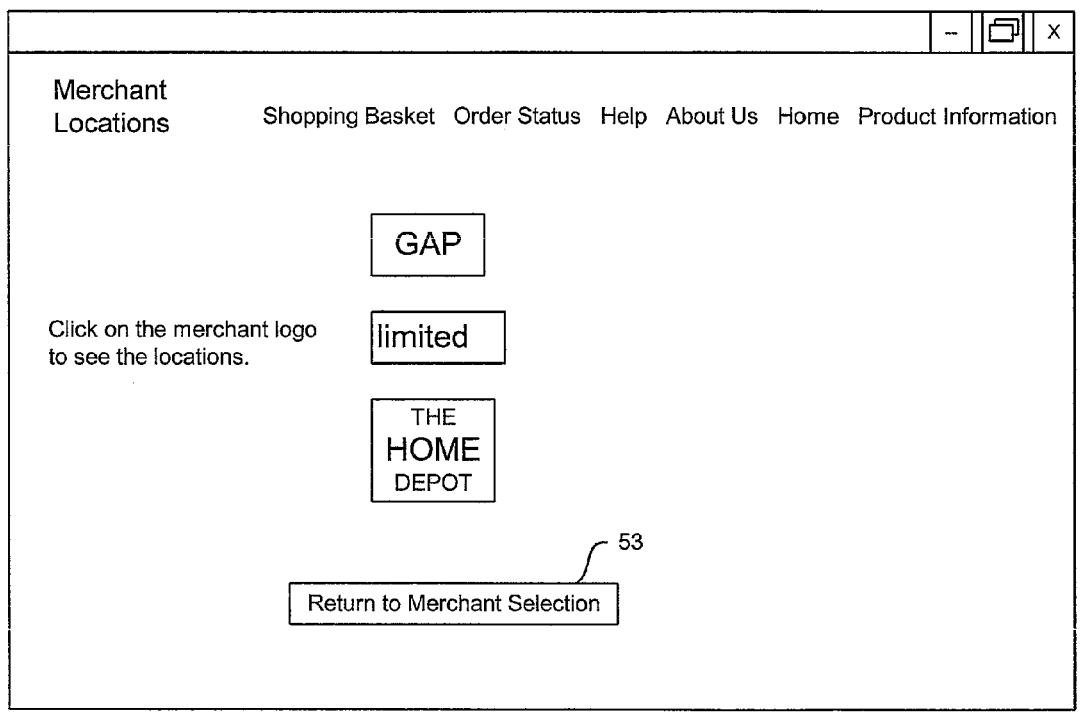
FIG. 8 is a pictorial view of a merchant location Web page according to the present invention.

The view merchant location feature the present invention enables the customer to determine if a particular merchant has a location near the intended recipient. If the customer selects control 51, the system displays a merchant location Web page, of the type illustrated in FIG. 8. Referring to FIG. 8, a customer may click on a merchant logo to obtain the merchant location information. If the customer does not desire to see location information, the customer may return to the merchant selection Web page of FIG. 7 by selecting a "Return To Merchant Selection" control 53 or by clicking on the browser's back button. If the customer selects a merchant logo control in FIG. 8, the system displays a Web page of the type illustrated in FIG. 9, which contains hypertext links to state merchant listings. The customer may select a state hypertext link to view a state listing, of the type illustrated in the Web page of FIG. 10. If the recipient's state, or a closely adjacent state, is not listed in the Web page of FIG. 9, the customer can return to the Web page of FIG. 8 by selecting the "View Merchant List" control 55, or return to the merchant selection Web page of FIG. 7 by selecting a "Return To Merchant Selection" control 57.

Figure 9:
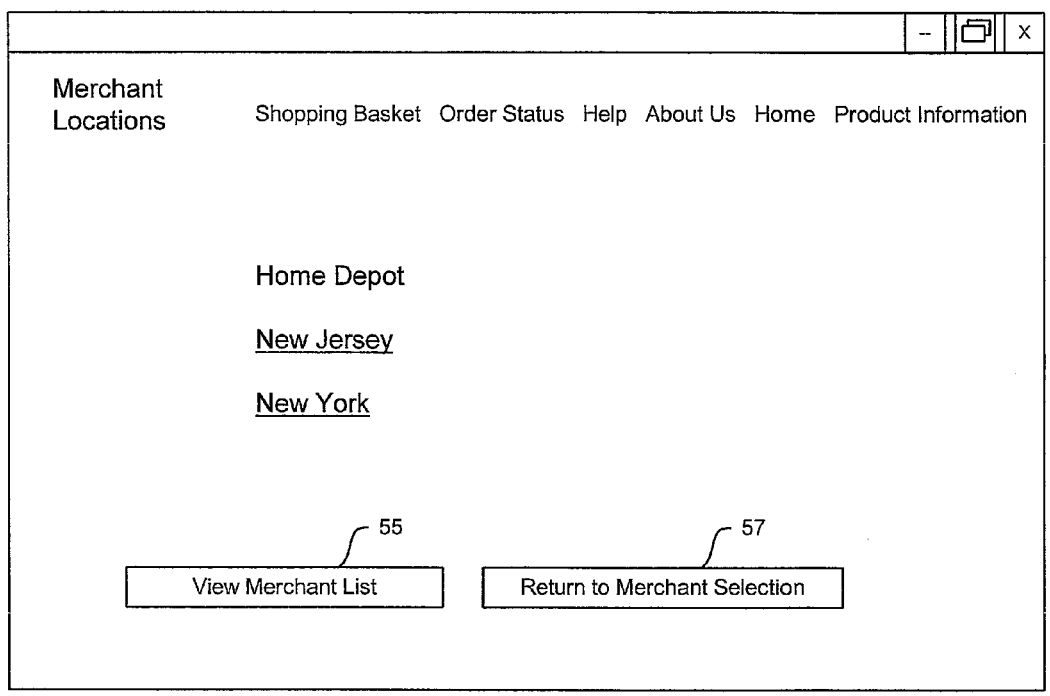
FIG. 9 is a pictorial view of a merchant location state selection Web page according to the present invention.
Figure 10:
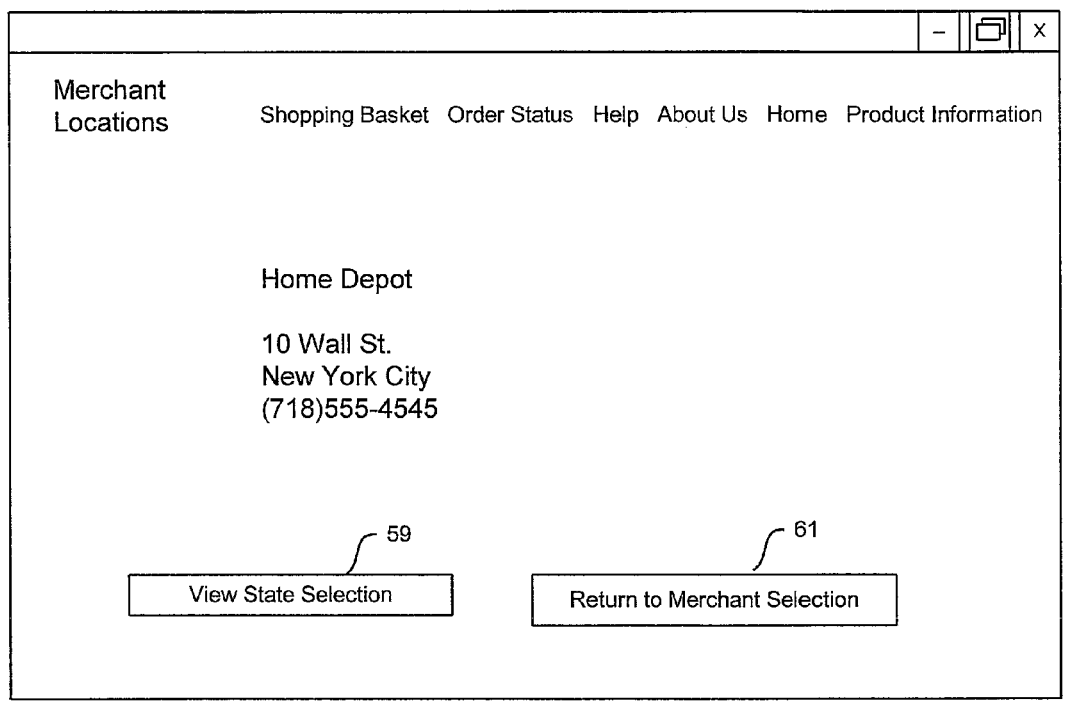
FIG. 10 is a pictorial view of a merchant establishment location Web page according to the present invention.

The Web page of FIG. 10 includes a listing of merchant locations within the state selected in the Web page of FIG. 9. The customer can determine from the Web page of FIG. 10 if the selected merchant has a location in or near the city where the recipient lives. After the customer has viewed the Web page of FIG. 10, the customer can return to the state selection Web page of FIG. 9 by selecting a "View State Selection" control 59, or return to the merchant selection Web page of FIG. 75 selecting a "Return To Merchant Selection" control 61.

After the customer has selected a merchant by clicking on a logo icon of the Web page of FIG. 7, the server presents to the customer of a Web page of the type illustrated in FIG. 11. The Web page of FIG. 11 prompts the customer to enter the number of cards desired, by entering a number in an entry field 63, and to select the amount of the gift card to be given, by clicking on an appropriate radio button 65. Thus, according to the present invention, a customer can order multiple gift cards in a single transaction. After the customer has entered the number and amount of the cards to be given, the customer proceeds to sender and recipient identification and card personalization by clicking on a "Go To Step 3" control 67.

Figure 12:
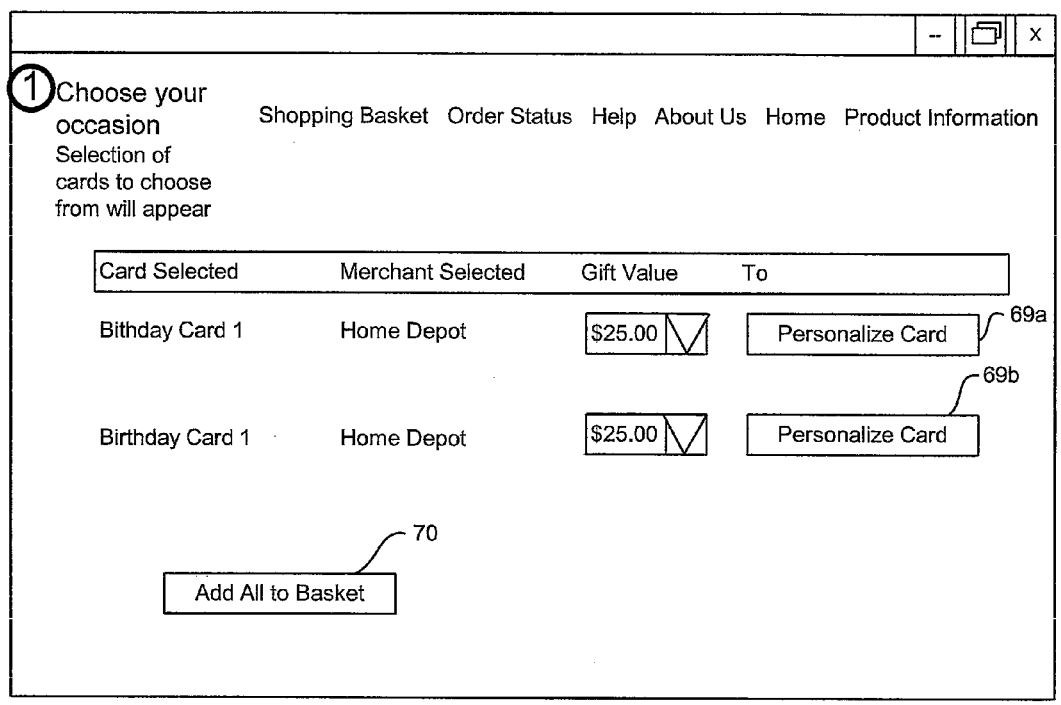
FIG. 12 is a pictorial view of a multiple gift card order list Web page according to the present invention.

If the number of cards entered in entry fields 63 of the Web page of FIG. 11 is greater than one, the system presents to the customer a Web page of the type illustrated in FIG. 12. The Web page of FIG. 12 includes a line for each card. Each line contains the identity of the card selected, the identity of the merchant selected, the gift value box, and the identity of recipient, which is initially blank. Each line includes a "Personalize Card" control 69. The gift value box includes a spin control by which the customer can increase or decrease the amount of the gift associated with a particular card. When the customer selects "Personalize Card" control 69, the system presents to the customer a Web page of the type illustrated in FIG. 13. The Web page of FIG. 13 is shown scrolled in FIGS. 13A and 13B.

The Web page of Figure is 13A and 13B enables the customer to personalize the selected gift card. The Web page of FIG. 13 includes a set of recommended verses 71, one of which the customer can select by clicking on an appropriate radio button. The Web page of FIG. 13 prompts the customer to enter the recipient's name in a text entry field 73 and the sender's name in a text entry field 75. Since the system of the present invention may find application in business contexts, the customer may enter a company name in text entry field 77. The Web page of FIG. 13 includes an additional text entry field 79 into which the customer can type a personal message. Web page FIG. 13 also includes entry fields, indicated generally at 80, into which the customer enters the recipient's information for mailing, including the recipient's postal and electronic mail addresses. After the customer has completed for Web page FIG. 13, the customer may return to the Web page of FIG. 12 by selecting a "Return To Card List" control 81. When the customer returns to be Web page FIG. 12, the recipient's name entered text entry field 73 of FIG. 13 is inserted in the appropriate line under the "To" label. When the customer has personalized all of the cards listed in FIG. 12, the customer may continue to shop or check out by clicking on an "Add All to Basket" control 70.

Figure 14A:
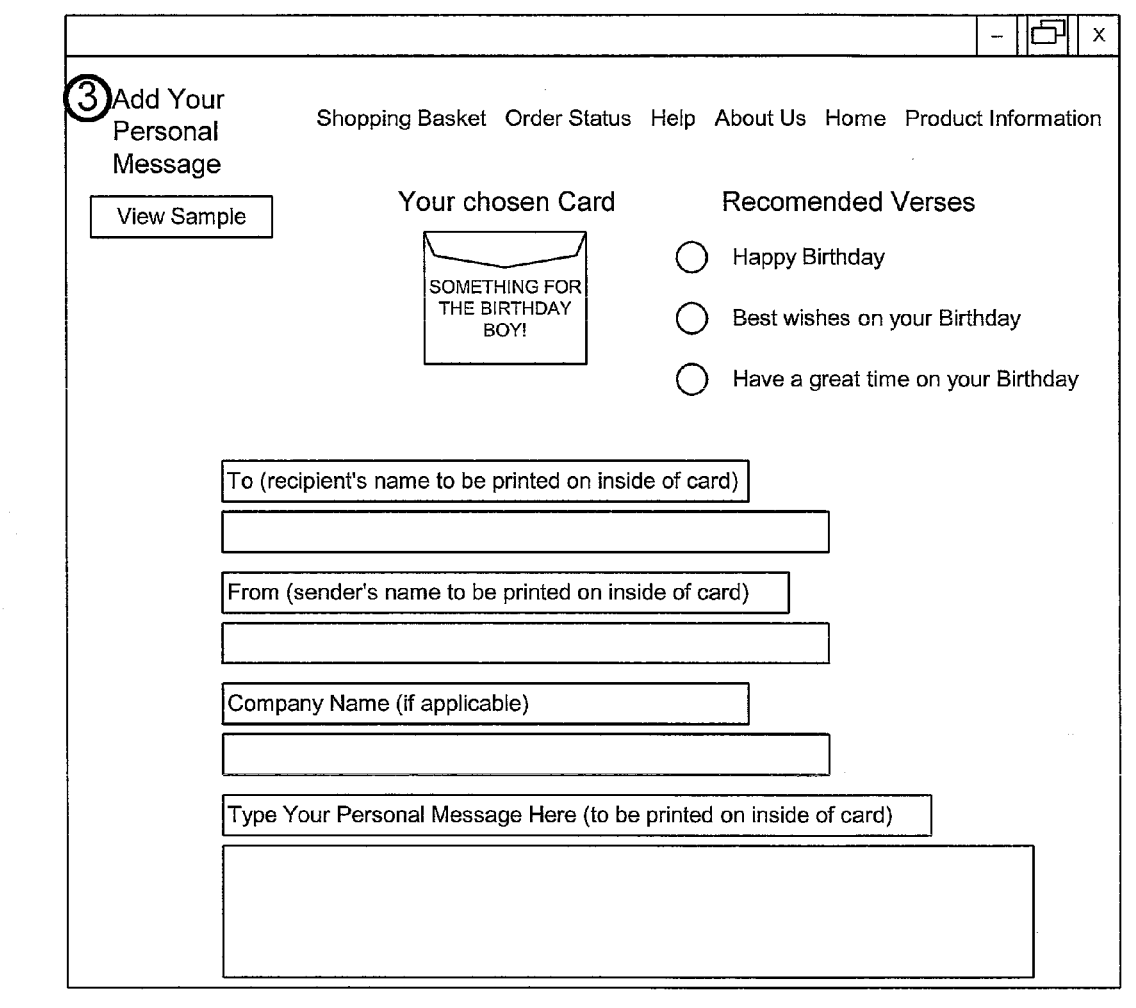

Referring again to FIG. 11, if the customer enters one in the number of cards desired entry field 63 and clicks on Go To Step 3 control 67, the Web server transmits to the customer a Web page of the type illustrated in FIG. 14. The Web page of FIG. 14 to similar to the Web page of FIG. 13, in that it collects the same information from the customer. However, as shown in FIG. 14B, the Web page of FIG. 14 includes an "Add To Basket" control 83 and a "Clear Entry" control 85. Thus, after the customer has completed the information required in FIG. 14, the customer can add the card to his or her shopping basket.

After the customer has completed selection and personalization of the gift card and added the gift card or cards to his or her shopping basket, the customer may proceed to check out. During checkout, the customer's credit card information is collected and verified and the order is passed to the production and fulfillment processes described above.

Figure 16:
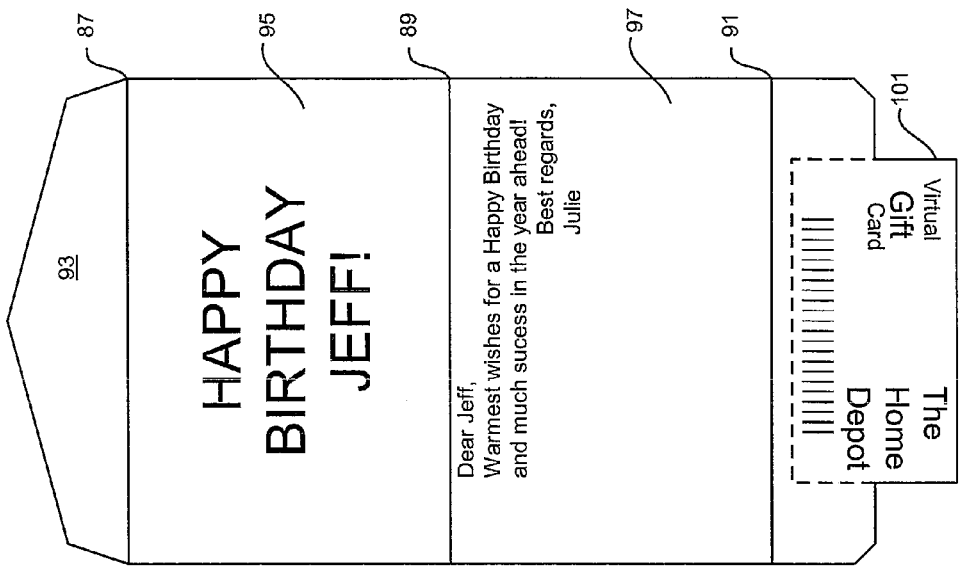
FIG. 16 is a view of the front side of a combined social expression card and gift certificate according to the present invention.
Figure 15:
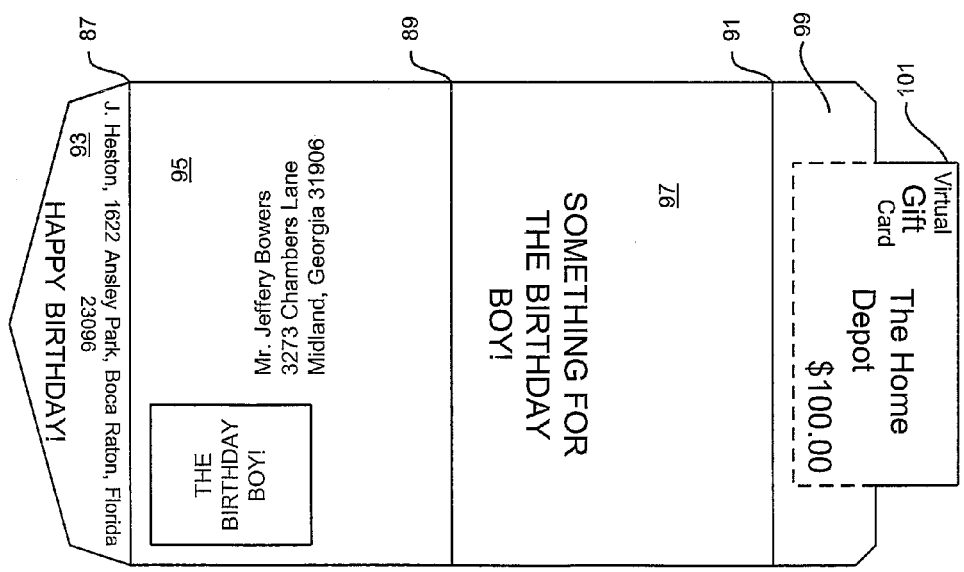
FIG. 15 is a view of the back side of a combined social expression card and gift certificate according to the present invention.
Figure 18:
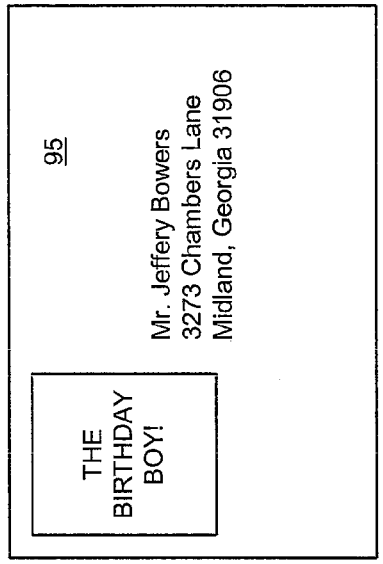
FIG. 18 is a view of the front side of a combined social expression card and gift certificate folded for mailing according to the present invention.
Figure 19:
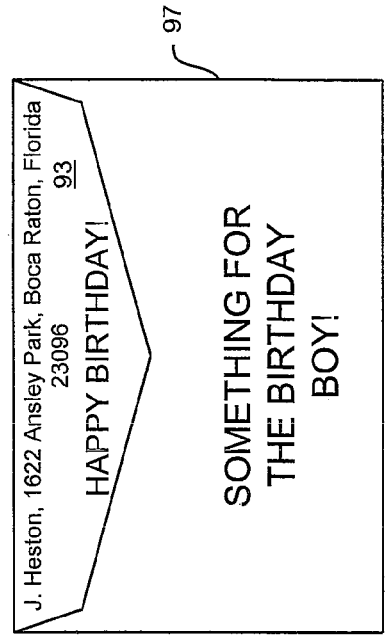
FIG. 19 is a view of the back side of a combined social expression card and gift certificate folded for mailing according to the present invention.
Figure 17:
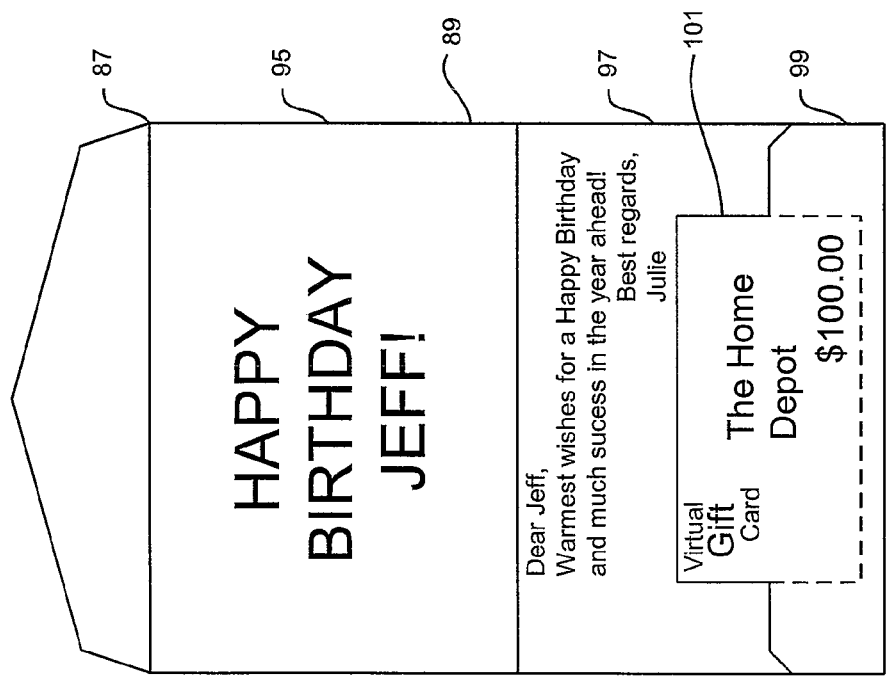
FIG. 17 is a view of a partially folded combined social expression card and gift certificate according to the present invention.

Referring now to FIGS. 15-19, there is illustrated the preferred embodiment of the printed gift card according to the present invention. Referring first to FIGS. 15 and 16, the gift card of the present invention is printed on both sides of a single sheet of card stock. FIG. 15 illustrates the back side of a card and FIG. 15 illustrates the front. Preferably, cards are printed two at a time on a large piece of card stock and then cut into the cards illustrated in the Figures. The card stock includes fold lines 87-91 that divide the card into four panels 93-99, and enable the card to be folded into a self-mailer as illustrated in FIGS. 18 and 19. Panel 93 defines a flap that has the sender's return address printed on the back side and an adhesive applied to the front side. Panel 95 has the recipient's address printed on the back side and a personalized greeting design printed on the front side. Panel 97 has a general greeting printed on the back side and a personalized greeting printed on the front side. Panel 99 includes a separable portion 101 upon which the gift certificate is printed. Separable portion 101 is preferably of wallet size so that the gift certificate can be removed from the card and conveniently carried by the recipient to the merchant or otherwise used to redeem the gift. Referring to FIG. 17, during folding, panel 99 is folded over the inside of panel 97 to display the gift certificate along with the personalized greeting. Then, the card is folded about fold line 89 can be flap of panel 87 is folded over and sealed.

From the foregoing, it may be seen that the present invention provides a convenient mechanism by which a person can shop for and purchase a social expression card and gift using a personal computer. The present invention has been illustrated and described with respect to presently preferred embodiments. Those skilled in the art will recognize alternative forms and embodiments given the benefit of the this disclosure. Certain features of the invention may be used independently of or in combination with other features. Accordingly, the foregoing disclosure is intended for purposes of illustration rather than limitation.

What is claimed is:

1. A method of providing combined social expression cards and gift certificates, which comprises the computer implemented steps of:
   presenting a remotely located user with a selection of social expression card designs;
   displaying to said remotely located user a list of merchants from which gift certificates are available;
   in response to user selection of a merchant from said list of merchants, displaying a list of locations for said selected merchant and prompting said remotely located user to designate a number of combined social expression card and gift certificates from said selected merchant to be delivered;
   presenting said remotely located user with a selection gift certificates available from said selected merchant; and,
   in response to user selection of a card design and a gift certificate, delivering a combined social expression card and gift certificate to an addressee designated by said remotely located user.

2. The method as claimed in claim 1, including the step of, in response user selection of a merchant from said list of merchants, prompting said remotely located user to designate a gift certificate amount.

3. The method as claimed in claim 2, wherein said step of prompting said user to designate a gift certificate amount includes the step of presenting to said user a list of available gift certificate amounts.

4. The method as claimed in claim 1, wherein said step of prompting said remotely located user to designate a number of combined social expression card and gift certificate to be delivered includes the step of prompting said user to enter a number of combined social expression card and gift certificates from said selected merchant to be delivered.

5. The method as claimed in claim 1, including the step of, if said designated number is equal to one, prompting said user to identify a recipient of said combined social expression card and gift certificate.

6. The method as claimed in claim 5, wherein said step of prompting said user to identify said recipient includes the step of prompting said user to enter a name and address for said recipient.

7. The method as claimed in claim 1, including the step of, if said designated number is greater than one, prompting said user to identify said designated number of recipients greater than one.

8. The method as claimed in claim 7, wherein said step of prompting said user to identify said designated number of recipients greater than one includes the step of presenting to said user a list of combined social expression card and gift certificates, the number of combined social expression card and gift certificates in said list being equal to said designated number of recipients greater than one.

9. The method as claimed in claim 8, including the step of, in response to user selection of a combined social expression card and gift certificate from said list, prompting said user to identify a recipient of said combined social expression card and gift certificate selected from said list.

10. The method as claimed in claim 9, wherein said step of prompting said user to identify said recipient includes the step of prompting said user to enter a name and address for said recipient.

11. The method as claimed in claim 1, including the step of prompting said user to personalize said combined social expression card and gift certificate.

12. The method as claimed in claim 11, wherein said step of prompting said user to personalize said combined social expression card and gift certificate includes the step of presenting to said user a list of sentiments.

13. The method as claimed in claim 11, wherein said step of prompting said user to personalize said combined social expression card and gift certificate includes the step of prompting said user to enter a sentiment.

14. The method as claimed in claim 1, including the step of printing said combined social expression card and gift certificate at a central location.

15. The method as claimed in claim 14, wherein said step of delivering said combined social expression card and gift certificate includes the step of mailing said combined social expression card and gift certificate from said central location to said addressee.

16. The method as claimed in claim 14, wherein said step of printing said combined social expression card and gift certificate includes the step of printing said combined social expression card and gift certificate on both sides of a single sheet of material.

17. The method as claimed in claim 16, wherein said step of printing said combined social expression card and gift certificate on both sides of a single sheet of material includes the steps of:
    printing a recipient name and mailing address on a first side of said sheet; and,
    printing a sender name and return address on said first side of said sheet.

18. The method as claimed in claim 17, including the step of folding said printed sheet into a mailer with said first side exposed.

19. The method as claimed in claim 18, wherein said sheet of material includes a separable portion and said step of step of printing said combined social expression card and gift certificate includes the steps of printing said gift certificate on said separable portion.

20. The method as claimed in claim 19, including the step of folding said separable portion over said second side of said sheet of material prior to folding said sheet of material into said mailer.

21. The method as claimed in claim 16, wherein said step of printing said combined social expression card and gift certificate on both sides of a single sheet of material includes the step of:
    printing a personalized sentiment on a second side of said sheet.

22. The method as claimed in claim 1, wherein said step of delivering said combined social expression card and gift certificate includes the step of delivering an electronic version of said combined social expression card and gift certificate to an electronic mail address for said addressee.

23. The method as claimed in claim 1, wherein said gift certificate includes a coupon.

24. The method as claimed in claim 1, wherein said gift certificate includes a stored value card.

25. The method as claimed in claim 1, wherein said step of displaying a list of locations includes the step of displaying a list of states in which said selected merchant has at least one location.

26. The method as claimed in claim 25, wherein said step of displaying a list of locations includes the step of, in response to user selection of state from said list of states, displaying a list of locations for said selected merchant within said selected state.

\* \* \* \* \*